United States Patent
Lim et al.

(10) Patent No.: US 7,643,699 B2
(45) Date of Patent: Jan. 5, 2010

(54) IMAGE PROCESSING BASED ON LOCAL NOISE STATISTICS

(75) Inventors: Suk Hwan Lim, San Mateo, CA (US); Pavel Kisilev, Maalot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 11/174,685

(22) Filed: Jul. 5, 2005

(65) Prior Publication Data

US 2007/0009175 A1  Jan. 11, 2007

(51) Int. Cl.
*G06K 9/40* (2006.01)
(52) U.S. Cl. .................................... 382/275
(58) Field of Classification Search ................ 382/275
See application file for complete search history.

(56) References Cited

U.S. PATENT DOCUMENTS

| 5,911,012 | A * | 6/1999 | Bernard et al. ............... 382/260 |
| 6,195,128 | B1 * | 2/2001 | Streater ................. 375/240.12 |
| 6,965,702 | B2 * | 11/2005 | Gallagher .................... 382/266 |
| 7,269,295 | B2 * | 9/2007 | Keshet et al. ................ 382/260 |
| 2003/0095716 | A1 * | 5/2003 | Gindele et al. .............. 382/260 |
| 2003/0099406 | A1 * | 5/2003 | Georgiev et al. ............ 382/268 |

* cited by examiner

*Primary Examiner*—Charles Kim
*Assistant Examiner*—Stephen R Koziol

(57) ABSTRACT

Processing of a digital image includes applying a function to a plurality of pixels in the image, the function relating a noise statistic to pixel intensity values. By applying the noise statistic function, a noise statistic value is produced for each of the pixels. Each of the pixels is processed with respect to its noise statistic value.

26 Claims, 3 Drawing Sheets

IMAGE PROCESSING BASED ON LOCAL NOISE STATISTICS

BACKGROUND

Imaging algorithms such as image enhancement, edge detection, auto-focus, and print quality control perform better if intrinsic image noise level is known. For instance, image enhancement can be more aggressive for lower noise levels.

An estimate of the noise level should be accurate. An incorrect noise estimate can lead to poor performance. For example, an incorrect noise estimate can result in overly aggressive denoising and, consequently, a blurrier image.

SUMMARY

According to one aspect of the present invention, processing of a digital image includes applying a function to a plurality of pixels in the image, the function relating a noise statistic to pixel intensity values. By applying the noise statistic function, a noise statistic value is produced for each of the pixels. Each of the pixels is processed with respect to its noise statistic value.

According to another aspect of the present invention, processing of a digital image includes estimating a noise statistic for each of a plurality of disjoint regions of the image, generating a function from the statistics, and using the function to modify pixels values of the image.

Other aspects and advantages of the present invention will become apparent from the following detailed description, taken in conjunction with the accompanying drawings, illustrating by way of example the principles of the present invention.

DETAILED DESCRIPTION

Figure 1:
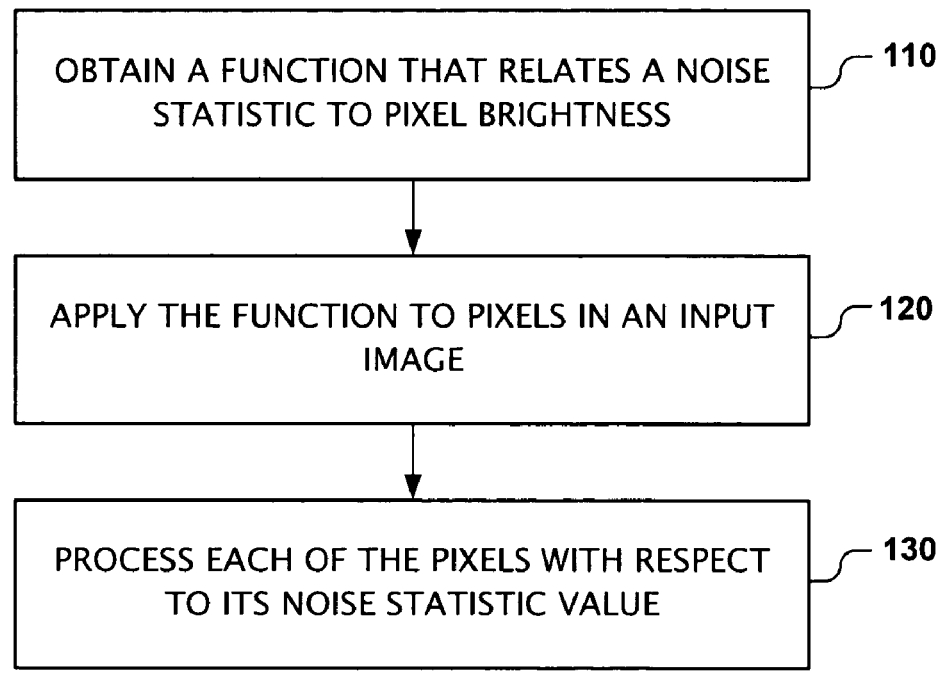
FIG. 1 is an illustration of a method in accordance with an embodiment of the present invention.

As shown in the drawings for purposes of illustration, the present invention is embodied in digital image processing that is adaptive to local noise levels. The processing is based on noise statistics that are assumed non-uniform across pixel intensity values.

Consider the variance of noise in a raw digital image produced by a typical image sensor. The noise variance in a raw image can be modeled as $\sigma_{total}^2 = \sigma_{read}^2 + \sigma_{shot}^2 + \sigma_{PRNU}^2 = \sigma_{read}^2 + Q + kQ^2$, where Q is the number of electrons generated by photons and dark current. According to this model, read noise ($\sigma_{read}^2$ in units of electrons) is constant, shot noise ($\sigma_{shot}^2$) is proportional to the square root of the light intensity, and PRNU ($\sigma_{PRNU}^2$) is proportional to light intensity.

Thus, the standard deviation of noise according to this model is a function of the brightness (intensity) values. In general, the standard deviation is typically higher for brighter areas. The dark areas have much smaller noise variance than mid-to-bright areas whereas the bright areas have much larger noise variance than the mid-to-dark areas.

This noise variance model does not hold for digital images that have been processed. Processing on raw digital images captured by digital cameras typically includes demosaicing, tone-mapping, color transformation, denoising and image compression. The processing can warp the noise statistics.

Figure 2A:
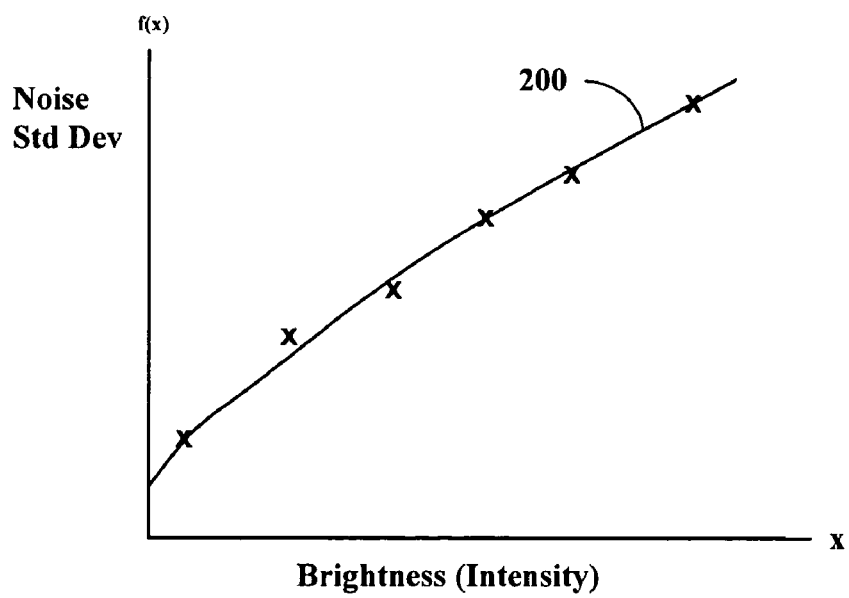
FIG. 2a is an illustration of a fitted curve of noise standard deviation versus brightness.

Reference is made to FIG. 1, which illustrates a general method of processing an input digital image. At step 110, a continuous function f(x) is obtained. The function f(x) relates a noise statistic to pixel intensity values. One example of such a function is illustrated in FIG. 2a. The curve 200 of FIG. 2a relates noise standard deviation to pixel intensity values. For each pixel intensity value (x), there is a value for noise standard deviation. The curve 200 covers all possible pixel values in the input image. For an n-bit pixel value, $0 < x < 2^n - 1$.

The function f(x) may be modeled as a polynomial equation. For example, the function may be modeled with three coefficients as $f(x) = a_0 + a_1 x + a_2 \sqrt{x}$. However, the polynomial equation is not limited to three coefficients. The coefficients can be stored in memory, and the function can be accessed by reading the coefficients from the memory.

At step 120, the continuous function is applied to a plurality of pixels in the input image. The continuous function is used to compute a noise statistic value for each of the pixels. The function may be applied to all pixels in the digital image, or only a subset of the pixels.

At step 130, each of the pixels is processed with respect to its noise statistic value. How the pixels are modified will depend on the processing goal and how the local noise statistic is used. The processing is not limited to any particular type. Denoising is but one example.

For example, the following bilateral filter may be used on the luminance channel of an input image:

$$y^*(i) = \frac{1}{\sum_j g(y(i) - y(i-j)) \cdot h(j)} \sum_j y(i-j) \cdot g(y(i-j) - y(i)) \cdot h(j)$$

where h(i) is the convolution kernel, y*(i) is the denoised output, and g(y(i)−y(i−j)) is the photometric distance term used for selective denoising without blurring edges. Thus, the function go determines whether the difference between neighboring pixels corresponds to noise or a feature (e.g., an edge) of the input image.

The photometric distance go is based on the function obtained in step 110. For example, $$g(x, I, PAR) = \exp\left(\frac{x^2}{k\sigma(I, PAR)}\right)$$

where PAR is noise parameters that may be computed by curve fitting. For example, $\sigma(I, PAR) = a + b\sqrt{I} + cI$. Optional parameter k may be multiplied to let users adjust the smoothness of the image. Thus, a local noise variance value is computed for each pixel as a function of pixel intensity and the estimated noise parameters that were obtained through curve fitting.

This denoising algorithm applies different smoothing to bright and dark areas such that the correct amount of smoothing is applied to both the bright and dark areas.

Steps 120 and 130 can be combined and performed in a single operation. For example, the bilateral filter performs steps 120 and 130 in a single operation.

The processing at step 130 is not limited to denoising. Other types of processing based on local noise statistics that vary from region to region include, without limitation, contrast enhancement and sharpening.

Contrast enhancement according to the present invention may be implemented by applying a tone-curve to an input, where the slope of the curve is limited by certain thresholds for intensity segments with high noise. The derivative of the contrast enhancement curve provides how much the noise standard deviation is going to increase by contrast enhancement. Contrast enhancement may be set higher for pixels in areas having lower noise levels. Use of local noise statistics makes contrast enhancement less likely to amplify noise beyond noticeable levels. Thus, contrast of an input image can be enhanced without making parts of the image very noisy.

For example, contrast enhancement may be implemented as y=k(x) on all pixels, where x denotes the light intensity at a pixel. The derivative of k(x) (i.e. k'(x)) is the gain (contrast enhancement factor) for pixel intensity x. Since the gain k'(x) also amplifies noise as much, the noise standard deviation after amplification becomes k'(x)σ(x).

Now let $\sigma_{max}(x)$ specify the threshold for barely tolerable noise standard deviation for a give pixel intensity x. To ensure that the noise standard deviation after amplification is less than $\sigma_{max}(x)$, the following gain $k'_{new}(x)$ may be used:

$$k'_{new}(x) \leq \sigma_{max}(x)/\sigma(x).$$

This gain $k'_{new}(x)$ can provide an additional constraint on determining the contrast enhancement curve k(x). In particular, values of k(x) that exceed $\int \sigma_{max}(x)/\sigma(x)$ are clipped to a corresponding value. Thus, σ(x) is obtained at step 110, $k'_{new}$ is obtained at step 120, and the contrast enhancement is performed at step 130.

A sharpening filter according to the present invention boosts the intensity of high frequency content of an image area based on the level of noise in the area. Since noise is typically in the high frequency band, noise is boosted when sharpening is applied. However a sharpening filter according to the present invention can use the noise statistics to determine how aggressively to sharpen an area. Consider a model in which bright areas contain low noise levels and dark areas contain high noise levels. An area containing low noise can be sharpened aggressively, whereas an area containing high noise can be sharpened less aggressively. Thus, a sharpening filter according to the present invention performs different sharpening on bright and dark areas.

Let I(m) be the intensity at pixel location m. Sharpening may be implemented as $$O(m)=I(m)+q(I(m))h(m)**I(m)$$

where h(m) may be a Laplacian kernel, parameter q determines how much high frequency component is added to the original image and ** is a convolution operator. The parameter q is not a constant, rather, it is dependent on the pixel intensity. In effect, the parameter q is dependent on noise standard deviation, since the noise standard deviations are different for different pixel intensities. Thus, q(x) is obtained at step 110 and applied as q(I(m)) at step 120. Then, sharpening is done in step 130.

In this example, the use of local noise standard deviation or variance can ensure that "noisy parts" of the image are not sharpened aggressively. A "noisy part" does not necessarily have high variance. In other examples, the signal-to-noise-ratio could be more important than the variance.

A method according to the present invention may be performed on grayscale images and color images. If the input image is a color image, the type of processing will determine how the different color channels are processed. For example, the bilateral filter above applies denoising only to the luminance channel. If processing is performed on all channels of a color image, the processing may be applied to all three channels separately or jointly. Luminance information may be used to compute the statistics for the chrominance channels, since the variance of chrominance depends on luminance intensity rather than chrominance intensity.

The processing of FIG. 1 may be performed on raw images and pre-processed images. The pre-processing may include, without limitation, demosaicing, tone-mapping, color transformation, denoising and image compression.

Two approaches of obtaining the noise statistic function (step 110) will now be described. In the first approach, a pre-computed noise statistic function is obtained. The noise statistic function may be pre-computed from parameters of the device that captured the input image. Thus, the first approach may be used on raw images, provided that the image capture device specification is known, and that the noise statistic function is based on parameters of that capture device.

The following parameters may be used to compute the function: read noise (σ_read) in electrons, conversion gain (k) in μV/electrons, and digital gain (DK) in Digital Number/V. These parameters may be taken from an image sensor (e.g., digital camera) specification sheet. In some cases, some other interchangeable parameters may be used.

Assume a pixel intensity of I_DN in Digital Number (DN). This corresponding pixel intensity in electrons may be computed as $I\_DN*10^6/(k*DK)$. From this, the variance of the noise for pixels with this pixel intensity may be computed as $$\sigma\_tot^2 = \sigma\_read^2 + I\_DN*10^6/(k*DK),$$

where σ_tot² is expressed in units of electron² that includes read noise and shot noise. Thus the standard deviation in digital numbers may be computed as $$k*(DK/10^6)*\text{sqrt}(\sigma\_read^2 + I\_DN*10^6/(k*DK)).$$

For simplicity, it was assumed that the image sensor does not have any PRNU (non-uniformity). However, PRNU can be incorporated into the noise standard deviation function.

Figure 2B:
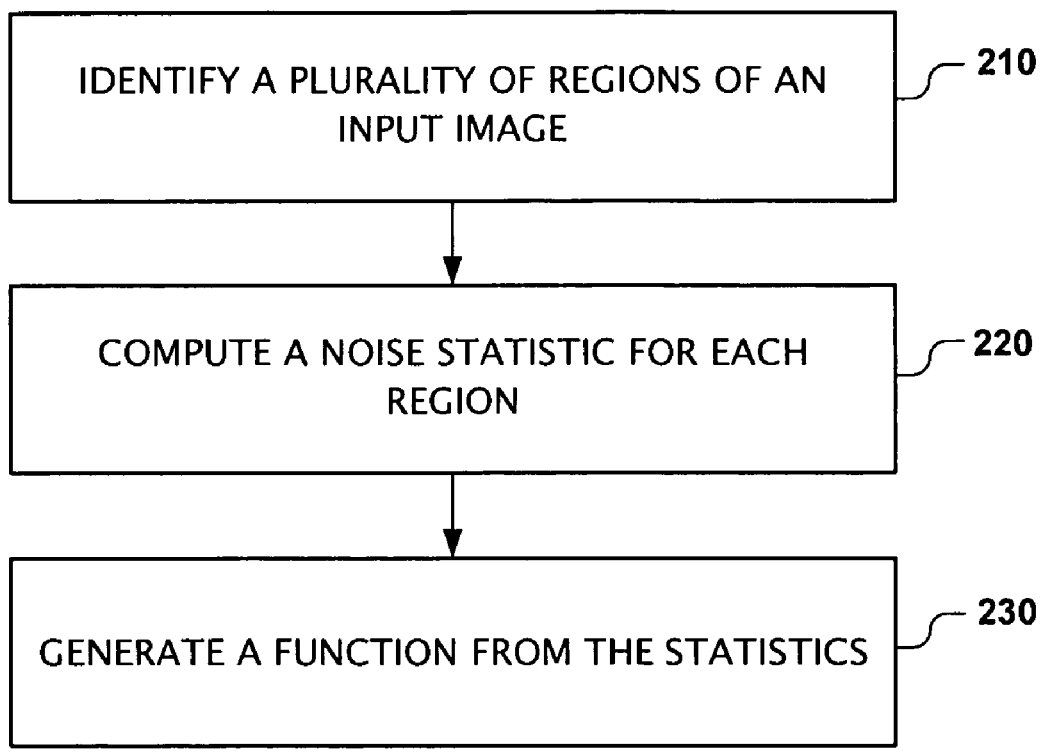
FIG. 2b is an illustration of a method of generating a noise statistic function in accordance with an embodiment of the present invention.

Reference is now made to FIG. 2b. In the second approach, the noise statistic function is computed from the input image itself.

At step 210, a plurality of non-overlapping regions of the input image are identified. The regions are not limited to any particular shape or size. For example, square regions could consist of many 8×8 blocks. However, the regions are not necessarily limited to square regions, even though square regions are easier to compute.

Random regions may be identified as follows. The image is divided into N×N blocks, where K=N², and the mean light intensity of each block is computed. A first random region consists of all blocks having mean intensity values within a first range, a second random region consists of all blocks having mean intensity values within a second range, and so on. For example, a first random region consists of blocks having mean intensity values between 0 and 50, a second random region consists of blocks having mean intensity values between 51 and 100, a third random region consists of blocks having mean intensity values between 101 and 150, a fourth random region consists of blocks having mean intensity values between 151 and 200, and a fifth random region consists of blocks having mean intensity values between 201 and 255. The method is not limited to five random regions; the number of random regions may depend on the size of the images At step 220, a noise statistic is computed for each region from its constituent blocks. For example, pixel variance ($s^2$) may be computed as $$s_m^2 = \frac{1}{K-1}\sum_{k=1}^{K}(y_{km}-\bar{y}_m)^2$$

where y and y-bar are a signal vector and a sample mean, and where m denotes the $m^{th}$ block. Noise variance ($s_{(1)}^2$) may be computed as the lowest variance among the blocks. That is, $s_{(1)}^2 = s_{min}^2$. The statistics (zero or negligible bias) are affected by the size and number of blocks. The accuracy of the noise estimator is determined by the number of blocks in the region.

The noise statistic is not limited to noise variance. Other statistics that could be used include, without limitation, variance versus luminance light intensity, spatial correlation, and cross-correlation between noise in different channels.

At step 230, a function is generated from the statistics. The function is not limited to any particular type. As a first example, the function could be a globally constant. For example, the statistics of a single region may be selected. The global estimator may be computed as the lowest variance among the blocks.

As a second example, the function may be computed by fitting a model to the statistics of the regions. For example, the function could be of noise variance versus pixel intensity. The pixel intensity could be computed as mean intensity values of the regions or the mean intensity values of the block that gave the smallest variance for each region.

Any noise model such as a polynomial model can be used, provided that the noise model is general enough to curve-fit the measurements. Preferably, the function is continuous. The continuous function allows noise level to be estimated for local parts of the image.

A second order function has been found to be sufficient. For example, the following model may be used for the curve fitting:

$$\sigma(I) = a + b\sqrt{I} + cI$$

where I is the brightness (intensity) value. This model is similar to the noise variance model for raw images, except that parameters b and c are allowed to be negative since image processing can severely warp the noise statistics. Curve-fitting methods such as least-squares may be used to estimate the parameters a, b and c. Simpler noise models may be used when the number of samples is small.

A method according to the present invention is not limited to any particular platform. The method can be used by computers, imaging devices (e.g., digital cameras, scanners, and certain PDAs and mobile phones) and printers.

Figure 3:
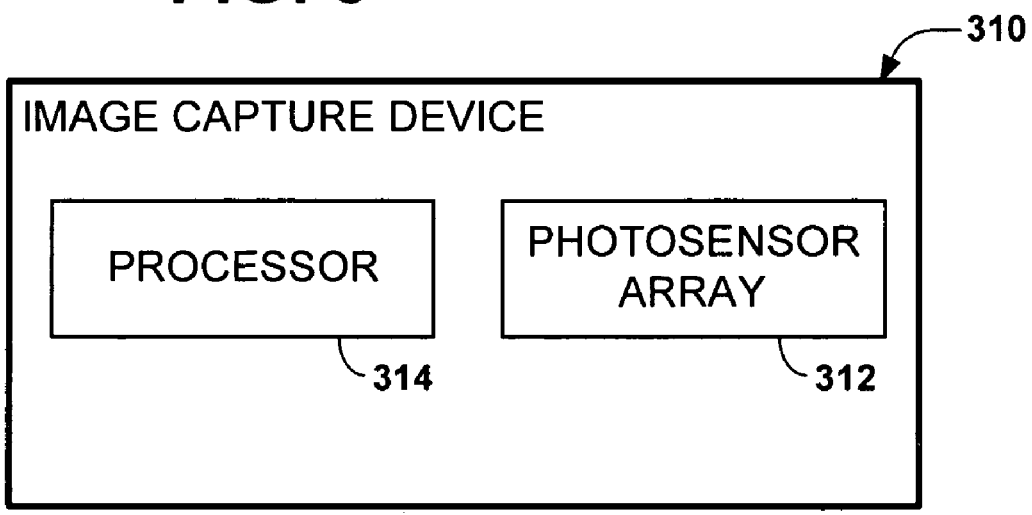
FIGS. 3-5 are illustrations of image processing systems in accordance with embodiments of the present invention.

Reference is made to FIG. 3, which illustrates an image capture device 310 that performs processing in accordance with the present invention. The image capture device 310 includes a photosensor array 312 that typically generates images having less than full color information at each pixel. The image capture device 310 further includes a processor 314 for processing the captured images into images that have full color information at each pixel. The processor 314 also performs processing in accordance with the present invention. Processing such as tone mapping, color correction and sharpening may be adapted to local noise levels. The processor 314 may be a digital signal processor, or it may include a state machine, or it may include an embedded processor and memory, or it may have some other design. The image capture device 310 may be, for example, a digital camera, scanner, cell phone or PDA.

Figure 4:
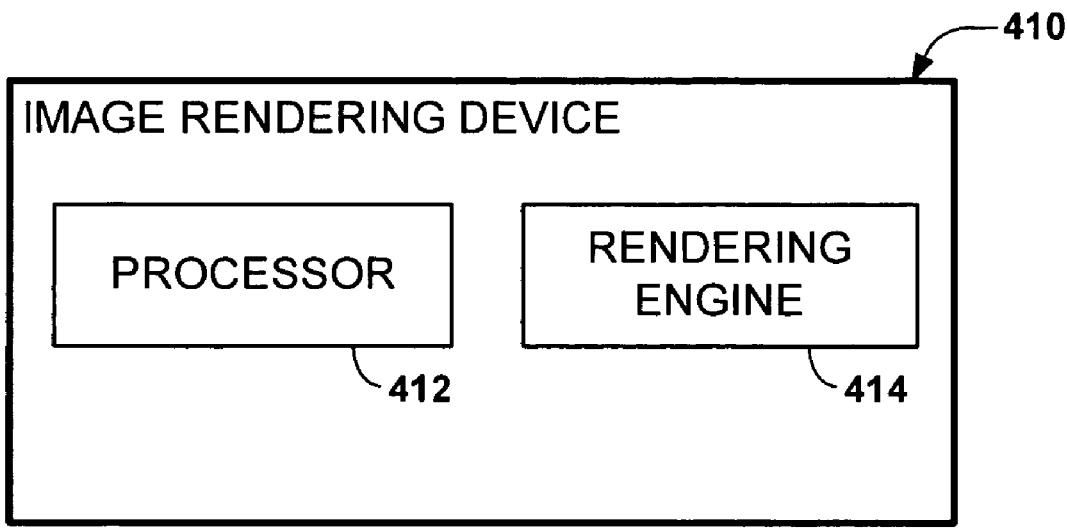

Reference is made to FIG. 4, which illustrates an image rendering device 410 that performs processing in accordance with the present invention. The image rendering device 410 includes a processor 412 and a rendering engine 414 (e.g., a print engine). In an image rendering device 410 such as a printer, the processor 412 decodes a JPEG bit stream, filters the decoded bit stream, performs halftoning on the filtered bit stream, and sends the filtered bit stream to the rendering engine 414. The processor 412 may perform the following processing in accordance with the present invention: tone mapping, color correction and sharpening.

Figure 5:
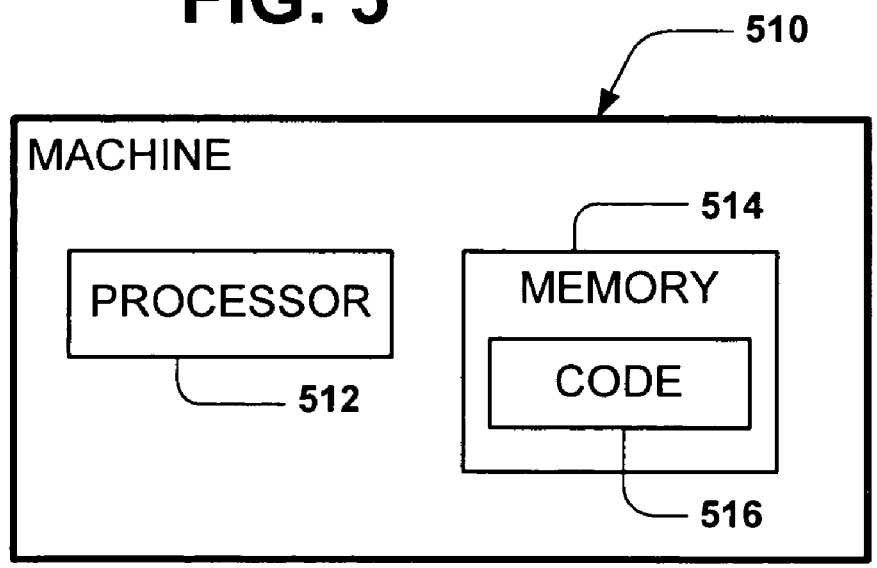
Figure 5:

Reference is made to FIG. 5, which illustrates a system 510 that performs processing in accordance with the present invention. The system 510 includes a general purpose processor 512 and memory 514 encoded with executable code 516 for causing the processor 512 to process digital images in accordance with the present invention. The system 510 may be, for example, a personal computer. Input images may be supplied to the system 510 directly by an image capture device or indirectly (via the Internet, accessed from remote or local storage, etc.). The system 510 may supply processed images, directly or indirectly, to an image rendering device, another computer, etc.

A machine for generating the code 516 may be a personal computer such as the one shown in FIG. 5. Source code is generated and compiled into executable code 518.

The code 518 may be distributed in variety of ways. For example, the code 518 may be distributed to a digital camera by burning the code into memory (e.g., EPROM) of the digital camera. The code 518 might be distributed to another computer, removable storage medium (e.g., CD), etc. The code 518 might be distributed as a standalone program, a web browser plug-in, as part of a larger program, etc.

Although specific embodiments of the present invention have been described and illustrated, the present invention is not limited to the specific forms or arrangements of parts so described and illustrated. Instead, the present invention is construed according to the following claims.

The invention claimed is:

1. A method of processing an input digital image, the method comprising:

applying a function to a plurality of pixels in the input image, the function relating a noise statistic to pixel intensity values, wherein a local noise variance value is produced for each of the pixels as a function of the pixel intensity values;

processing, using processor, each of the pixels with respect to its local noise variance value, including bilateral filtering and denoising the pixels using the local noise variance values, wherein a denoised output ($y^*(i)$) is calculated according to $$y^*(i) = \frac{1}{\sum_j g(y(i)-y(i-j))\cdot h(j)}$$

$$\sum_j y(i-j)\cdot g(y(i-j)-y(i))\cdot h(j)$$

where h(i) is a convolution kernel and g(y(i)–y(i–j)) is a photometric distance term used for selective denoising without blurring edges; and supplying a modified image based on the denoised pixels.

2. The method of claim 1, wherein the function is a continuous curve.

3. The method of claim 2, wherein the function is a second order function.

4. The method of claim 1, wherein the processing includes contrast enhancement that uses the local noise variance values.

5. The method of claim 1, wherein the processing includes sharpening that uses the local noise variance values.

6. The method of claim 1, further comprising obtaining the function prior to applying the function.

7. The method of claim 6, wherein the input image was captured by an image capture device; and wherein obtaining the function includes obtaining a function that is pre-computed from parameters of the image capture device.

8. The method of claim 6, wherein obtaining the function includes generating the function from the input image.

9. The method of claim 8, wherein generating the function includes estimating the local noise variance for each of a plurality of regions of the image; and generating the function from the region statistics.

10. A method of processing a digital image, the method comprising:

dividing the image into a plurality of blocks;

calculating a mean light intensity of each of the blocks;

grouping the blocks into regions according to the mean light intensity of the blocks;

calculating, using a processor, a noise statistic for each of the regions of the image, including calculating pixel variance ($s^2$) according to;

$$s_m^2 = \frac{1}{K-1} \sum_{k=1}^{K} (y_{km} - \bar{y}_m)^2$$

where y is a signal vector and y-bar is a sample mean, and where m is the $m^{th}$ block;

generating a function from the statistics;

using the function to modify pixels values of the image; and supplying a processed image based on the modified pixels.

11. Apparatus for processing an input digital image, the apparatus comprising a processor for applying a function to a plurality of pixels in the input image, the function relating a noise statistic to pixel intensity values, wherein a local noise variance value is produced for each of the pixels as a function of the pixel intensity values; the processor processing each of the pixels with respect to its local noise variance value, including denoising the pixels using the local noise variance values, wherein the denoising includes calculating a denoised output (y*(i)) according to $$y^*(i) = \frac{1}{\sum_j g(y(i) - y(i-j)) \cdot h(j)} \sum_j y(i-j) \cdot g(y(i-j) - y(i)) \cdot h(j)$$

where h(i) is a convolution kernel and g(y(i)–y(i–j)) is a photometric distance term used for selective denoising without blurring edges.

12. The apparatus of claim 11, wherein the function is a continuous curve.

13. The apparatus of claim 12, wherein the function is a second order function.

14. The apparatus of claim 11, wherein the processor uses the local noise variance values for contrast enhancement.

15. The apparatus of claim 11, wherein the processor uses the local noise variance values for sharpening.

16. The apparatus of claim 11, wherein the processor obtains the function prior to applying the function.

17. The apparatus of claim 16, wherein the input image was captured by an image capture device; and wherein obtaining the function includes obtaining a function that is pre-computed from parameters of the image capture device.

18. The apparatus of claim 16, wherein obtaining the function includes generating the function from the input image.

19. The apparatus of claim 18, wherein generating the function includes estimating the local noise variance for each of a plurality of regions of the image; and generating the function from the region statistics.

20. A memory encoded with code for causing a processor to apply a function to a plurality of pixels in an input image, the function relating a noise statistic to pixel intensity values, wherein a local noise variance value is produced for each of the pixels as a function of the pixel intensity values, the code further causing the processor to process each of the pixels with respect to its local noise variance value, including denoising the pixels using the local noise variance values, wherein the denoising includes calculating a denoised output (y*(i)) according to $$y^*(i) = \frac{1}{\sum_j g(y(i) - y(i-j)) \cdot h(j)} \sum_j y(i-j) \cdot g(y(i-j) - y(i)) \cdot h(j)$$

where h(i) is a convolution kernel and g(y(i)–y(i–j)) is a photometric distance term used for selective denoising without blurring edges.

21. The memory claim 20, wherein the processing includes contrast enhancement that uses the local noise variance values.

22. The memory of claim 20, wherein the processing includes sharpening that uses the noise statistic values.

23. The memory of claim 20, wherein the function prior is obtained to applying the function.

24. The memory of claim 23, wherein the input image was captured by an image capture device; and wherein obtaining the function includes obtaining a function that is pre-computed from parameters of the image capture device.

25. The memory of claim 23, wherein obtaining the function includes generating the function from the input image.

26. The memory of claim 25, wherein generating the function includes estimating the local noise variance for each of a plurality of regions of the image; and generating the function from the region statistics.

* * * * *

UNITED STATES PATENT AND TRADEMARK OFFICE
CERTIFICATE OF CORRECTION

| | | |
|---|---|---|
| PATENT NO. | : 7,643,699 B2 | Page 1 of 1 |
| APPLICATION NO. | : 11/174685 | |
| DATED | : January 5, 2010 | |
| INVENTOR(S) | : Suk Hwan Lim et al. | |

It is certified that error appears in the above-identified patent and that said Letters Patent is hereby corrected as shown below:

In column 6, line 56, in Claim 1, after "using" insert -- a --.

In column 8, line 46, in Claim 21, after "memory" insert -- of --.

Signed and Sealed this

Fifteenth Day of June, 2010

David J. Kappos
*Director of the United States Patent and Trademark Office*